US008357442B2

(12) United States Patent
Whittaker et al.

(10) Patent No.: US 8,357,442 B2
(45) Date of Patent: Jan. 22, 2013

(54) HEAT SHRINK WIRE MARKER CARRIER

(75) Inventors: Shawn E Whittaker, Buford, GA (US);
David S Morrison, Cumming, GA (US)

(73) Assignee: Panduit Corp., Tinley Park, IL (US)

( * ) Notice: Subject to any disclaimer, the term of this patent is extended or adjusted under 35 U.S.C. 154(b) by 1372 days.

(21) Appl. No.: 11/843,790

(22) Filed: Aug. 23, 2007

(65) Prior Publication Data

US 2009/0053435 A1    Feb. 26, 2009

(51) Int. Cl.
    B32B 9/00      (2006.01)
    B32B 23/02     (2006.01)
    B32B 7/14      (2006.01)
(52) U.S. Cl. ...... 428/40.1; 428/42.2; 428/192; 428/201; 283/81
(58) Field of Classification Search .......... 428/40.1, 428/42.1, 42.2, 42.3, 192, 194, 201, 203, 428/214, 438; 283/81
    See application file for complete search history.

(56) References Cited

U.S. PATENT DOCUMENTS

| 2,013,844 | A |   | 9/1935  | Sherman |
|-----------|---|---|---------|---------|
| 2,058,035 | A |   | 10/1936 | Rand |
| 2,201,950 | A |   | 5/1940  | Wolters et al. |
| 2,217,506 | A |   | 10/1940 | Bottle |
| 3,339,828 | A |   | 9/1967  | Hiersteiner |
| 3,351,190 | A |   | 11/1967 | McGuire |
| 3,536,550 | A |   | 10/1970 | Von Hofe |
| 3,804,226 | A |   | 4/1974  | Ellis |
| 3,894,731 | A |   | 7/1975  | Evans |
| 4,004,362 | A | * | 1/1977  | Barbieri ................. 40/316 |
| 4,032,010 | A |   | 6/1977  | Evans |
| 4,070,223 | A |   | 1/1978  | Stalzer |
| 4,191,405 | A |   | 3/1980  | Johnstun |
| 4,198,451 | A |   | 4/1980  | Johnstun |
| 4,347,274 | A |   | 8/1982  | Janssen |
| 4,361,230 | A |   | 11/1982 | Downing et al. |

(Continued)

FOREIGN PATENT DOCUMENTS

| EP | 0545836 A1 | 6/1993 |
|----|-----------|--------|
| GB | 2071010 A | 9/1981 |

(Continued)

OTHER PUBLICATIONS

Brady Identification Solutions Catalog, front cover, pp. 111-114 and back cover, 2005.

(Continued)

Primary Examiner — Patricia Nordmeyer
(74) Attorney, Agent, or Firm — Robert A. McCann; Christopher S. Clancy; James H. Williams

(57) ABSTRACT

A wire marker is provided. A carrier strip includes a first layer having at least one opening, two bands applied to opposite edges of the first layer, the bands including an adhesive on at least one side, and a label secured into the opening and attached to the adhesive. At least one access perforation may be located on the first layer that is horizontal and adjacent to one side of the opening. The access perforation facilitates removal of the label from the carrier and allows for insertion of a cable through the label. A plurality of horizontal carrier perforations may further be located between each opening on the first layer to facilitate removal of the carrier strip from a printer.

20 Claims, 5 Drawing Sheets

U.S. PATENT DOCUMENTS

| | | | |
|---|---|---|---|
| 4,363,401 A | 12/1982 | Savagian |
| 4,425,390 A | 1/1984 | Changani et al. |
| 4,442,939 A | 4/1984 | Downing |
| 4,448,558 A | 5/1984 | Weingarten |
| 4,487,645 A | 12/1984 | Weston |
| 4,586,610 A | 5/1986 | Gandolfo |
| 4,865,895 A | 9/1989 | Vlamings et al. |
| 5,862,751 A | 1/1999 | Triantopoulos et al. |
| 6,277,456 B1 | 8/2001 | Bulgrin et al. |
| 2006/0040083 A1 | 2/2006 | Erwin et al. |

FOREIGN PATENT DOCUMENTS

| | | |
|---|---|---|
| GB | 2309955 A | 8/1997 |

OTHER PUBLICATIONS

Panduit Military Grade Heat Shrink Labels Specification Sheet, 2 pages, Nov. 2005.

Brady PermaSleeve Wire Marking Sleeves Brochure, 3 pages, 2007.

Brady Sleeves for Wire and Cable Identification Brochure, 7 pages, 2007.

* cited by examiner

HEAT SHRINK WIRE MARKER CARRIER

BACKGROUND

1. Field of the Application

This application relates generally to labeling devices. More particularly, the application relates to labeling devices used with electronic printing devices.

2. Description of the Related Art

In devices or equipment, such as in airplanes, boats, computer networks or equipment that contains many wires, cables, or other items that may either get easily tangled or confused with other similar items, it is necessary to label the wires, cables or groups of cables of wires. Tags and marker assemblies have been designed to form labels for such uses. Heat shrink technology has been employed in making these markers and tags thereby permitting easy installation. Once applied, the labels are difficult to remove.

Generally, a carrier strip of material containing a plurality of markers is fed through a machine, whereby the markers will pass through a printing station for imprinting images onto each marker. Previous designs for carrying out the process utilize carrier strips that are bulky and not adapted for use in different types of printers. Such carriers tend to be stiff, which may cause the images printed on the markers to be distorted. Further, the stiff material may not be easily moved through the printer, since the carrier may have to negotiate curves or bends within the assembly.

Likewise, stiffer material is generally more expensive to produce and may need to be wider than necessary so that there is a sufficient area to move and rotate the carrier. For instance, many current carrier strip designs are track driven or use pin feeds for the carriers' movement. This may require a wider strip, which also adds to the cost of the material needed for producing the carrier strips.

A new carrier strip for a printing assembly is desired that will provide the needed support for the labels, while providing a high degree of flexibility for the carrier strip for use in printing machines. The carrier strip should also allow the labels to be easily removed from the carrier strip and allow for insertion of a cable through the label.

These as well as other aspects and advantages will become apparent to those of ordinary skill in the art by reading the following detailed description, with reference where appropriate to the accompanying drawings. Further, it should be understood that the embodiments described in this summary and elsewhere are intended to illustrate the invention by way of example only.

SUMMARY

One embodiment of the present application meets the shortcomings of the prior art by providing a carrier strip having a first layer with at least one opening and two bands applied to opposite edges of the first layer, the bands including an adhesive on at least one surface. The carrier strip further includes a label secured into the opening and attached to the adhesive. At least one access perforation is located on the first layer that is horizontal and adjacent to one side of the opening. The access perforation facilitates separation of the label from the carrier strip and allows for insertion of a cable through the label.

BRIEF DESCRIPTION OF THE DRAWINGS

Exemplary embodiments of the invention are described herein with reference to the drawings, in which.

DETAILED DESCRIPTION

Figure 1:
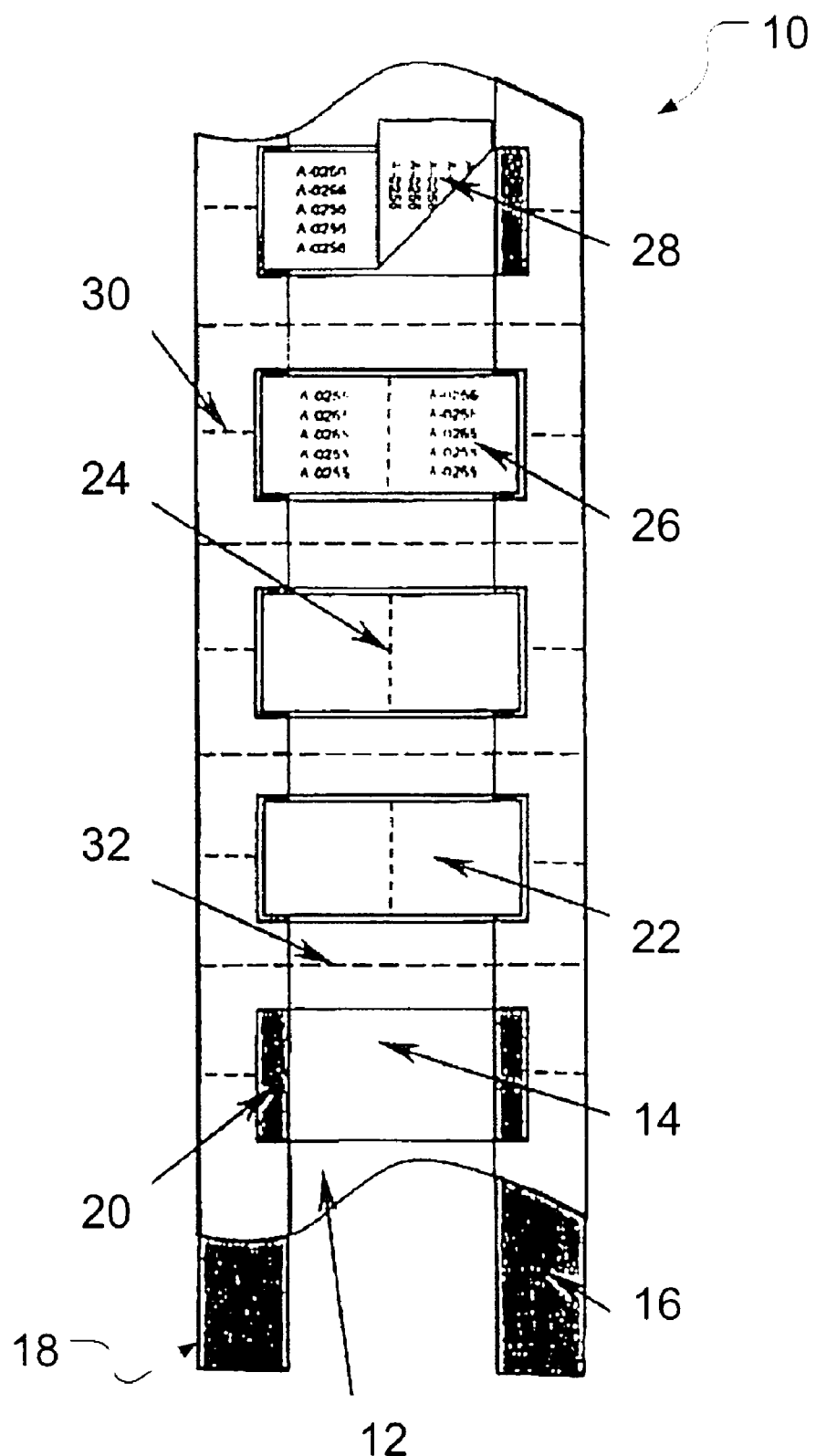
FIG. 1 is a front view of the carrier strip of the present application.

Referring to FIG. 1, a carrier strip 10 for use in a labeling assembly (not shown) is provided. The carrier strip 10 includes film 12 which in one embodiment is a clear, transparent film. The film 12 allows for printer registration directly onto each individual marker, which produces a precise print location and minimal waste when starting a print job. Furthermore, printers that utilize an optical sensor for print registration will detect the opacity difference between the clear film and an opaque label 22, which will be described in detail below. The film 12 may be made of plastic, or any other flexible material, such as paper or card stock, for example.

Figure 2:
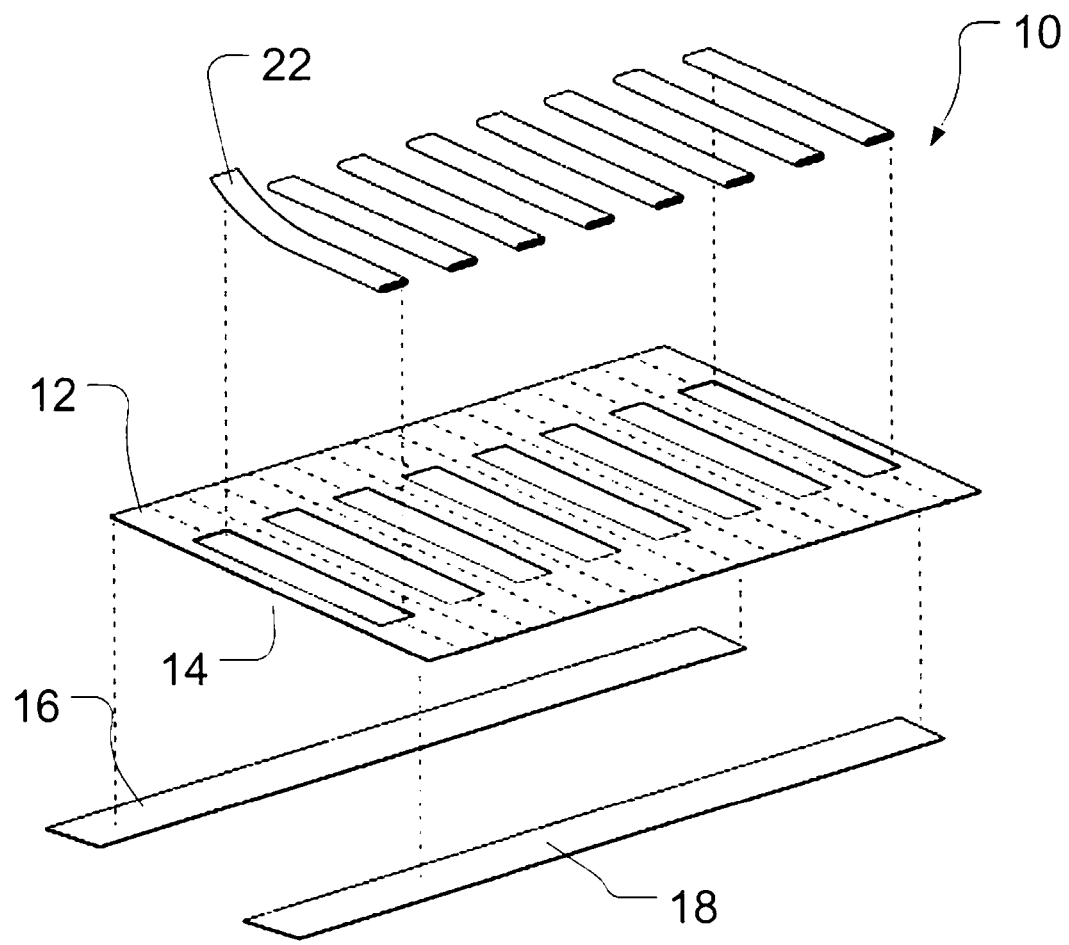
FIG. 2 is an exploded view of the carrier strip of FIG. 1.

Preferably, the carrier strip 10 further includes at least one die cut opening 14, as best seen in FIG. 2. The carrier strip 10 may include a plurality of die cut openings 14. The die cut openings 14 may be rectangular in shape. Alternatively, the openings 14 may be any other suitable shape that allows for two-sided printing.

Figure 3:
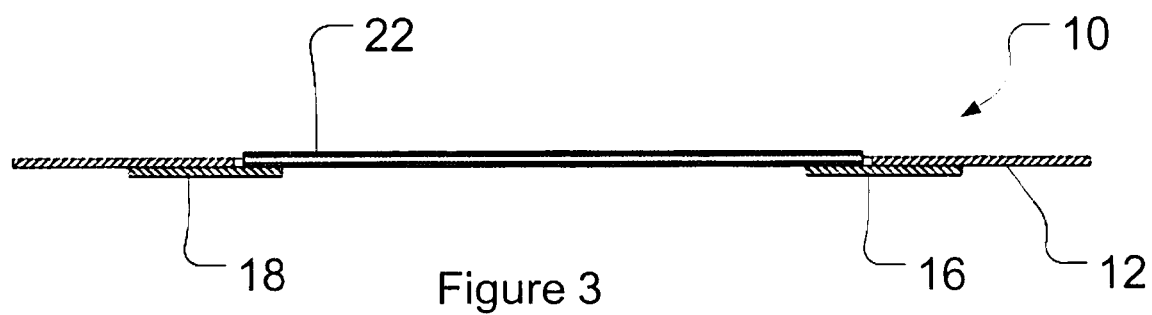
FIG. 3 is a detailed view of the wire marker of FIG. 1.
Figure 4:
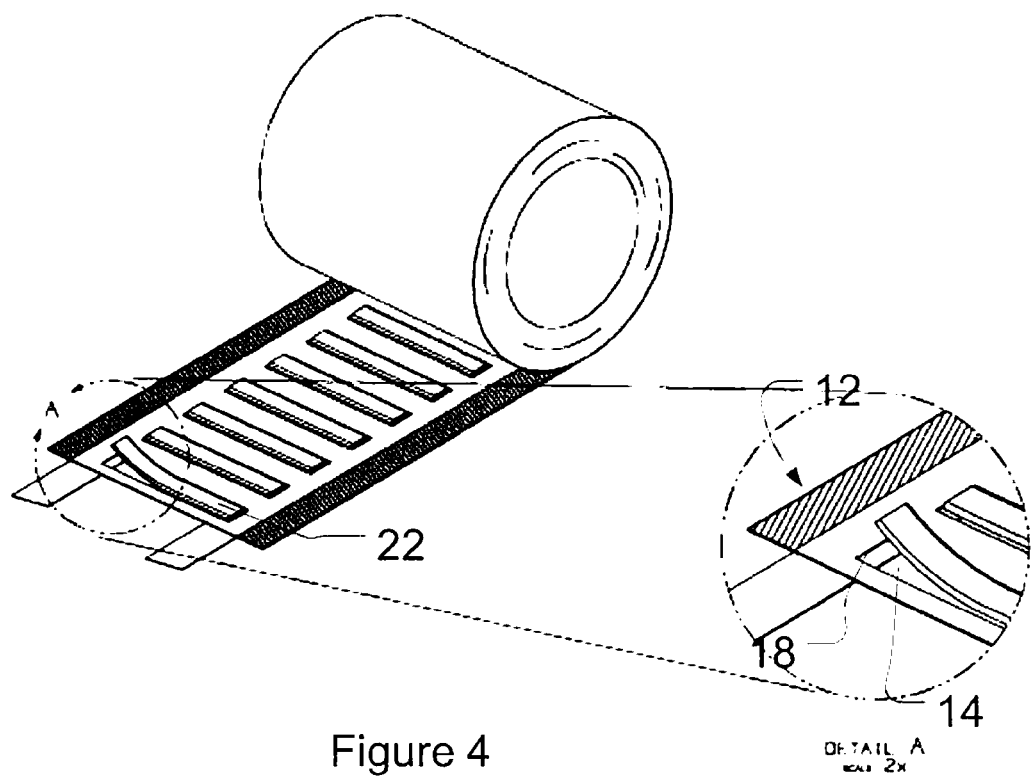
FIG. 4 is a cross-sectional view of the carrier strip of FIG. 1.

Two bands 16, 18 are applied on opposite edges of the film 12 on the carrier strip 10, as shown in FIG. 2. The bands 16, 18 may be secured to the film 12 by adhesive 20, such as pressure sensitive adhesive, which is located on at least one surface of each band 16, 18. The adhesive 20 may be applied to only one surface of each of the bands 16, 18 to allow for easy removal of the wire marker, which is described in detail below, or insertion of a wire or cable while the wire marker is still located on the carrier strip 10. The bands 16, 18 are placed onto the carrier strip 10 so that a small amount of non-transferable adhesive 20 is exposed on the side edges of die cut openings 14, as seen in FIGS. 3 and 4.

Figures 5A, 5B, 5C:
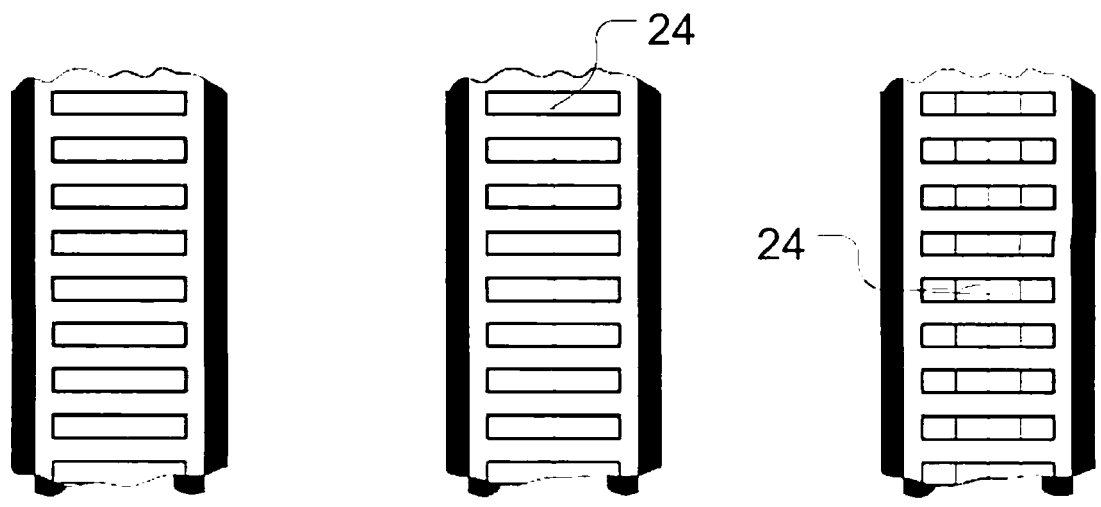
FIGS. 5A-5C show alternate embodiments of the carrier strip of FIG. 1.

The carrier strip 10 further includes a plurality of labels 22 which are secured into the die cut openings 14 by adhering to the exposed adhesive 20. The labels 22 may be flattened tubing or plates. FIG. 4 shows a cross-section of the carrier strip 10. The labels 22 may be opaque so a printer having an optical sensor can detect the difference between the clear carrier strip 10 and the opaque labels 22. The labels 22 may be clear or transparent if the carrier strip 10 is opaque, or both the labels 22 and the carrier strip 10 may be opaque if an aperture or other marking is used to create an opacity difference. The labels 22 may each optionally include a vertical tubing perforation 24 to allow the labels 22 to be divided into smaller pieces. As shown in FIGS. 5A-5C, any number of tubing perforations 24 may be used to divide the labels 22.

Figure 6:
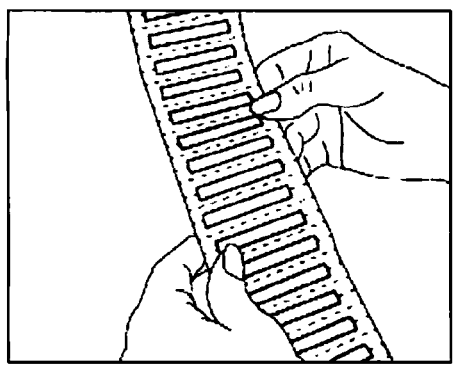
FIG. 6 shows the carrier strip being folded in a first direction.
Figure 6:
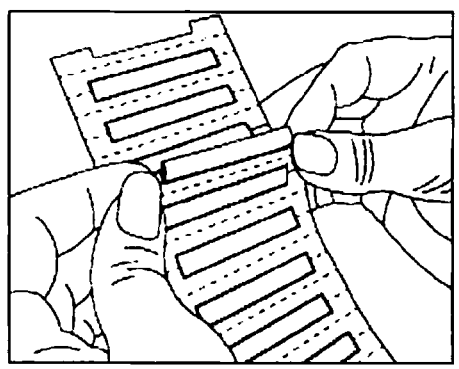
Figure 6:
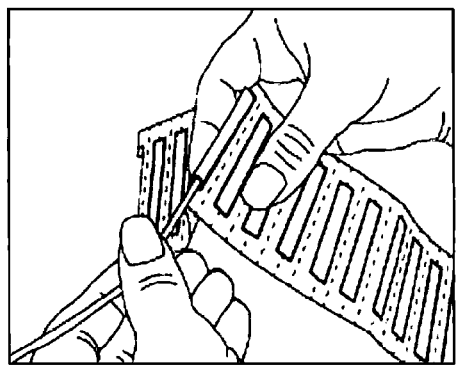
Figure 6:
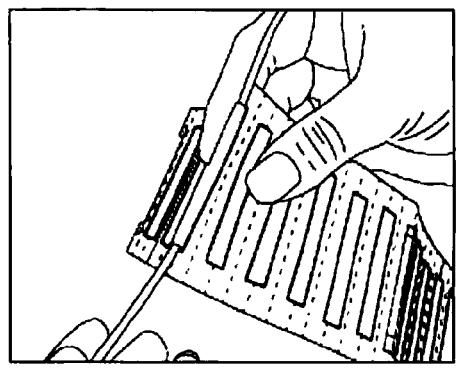
Figure 7:
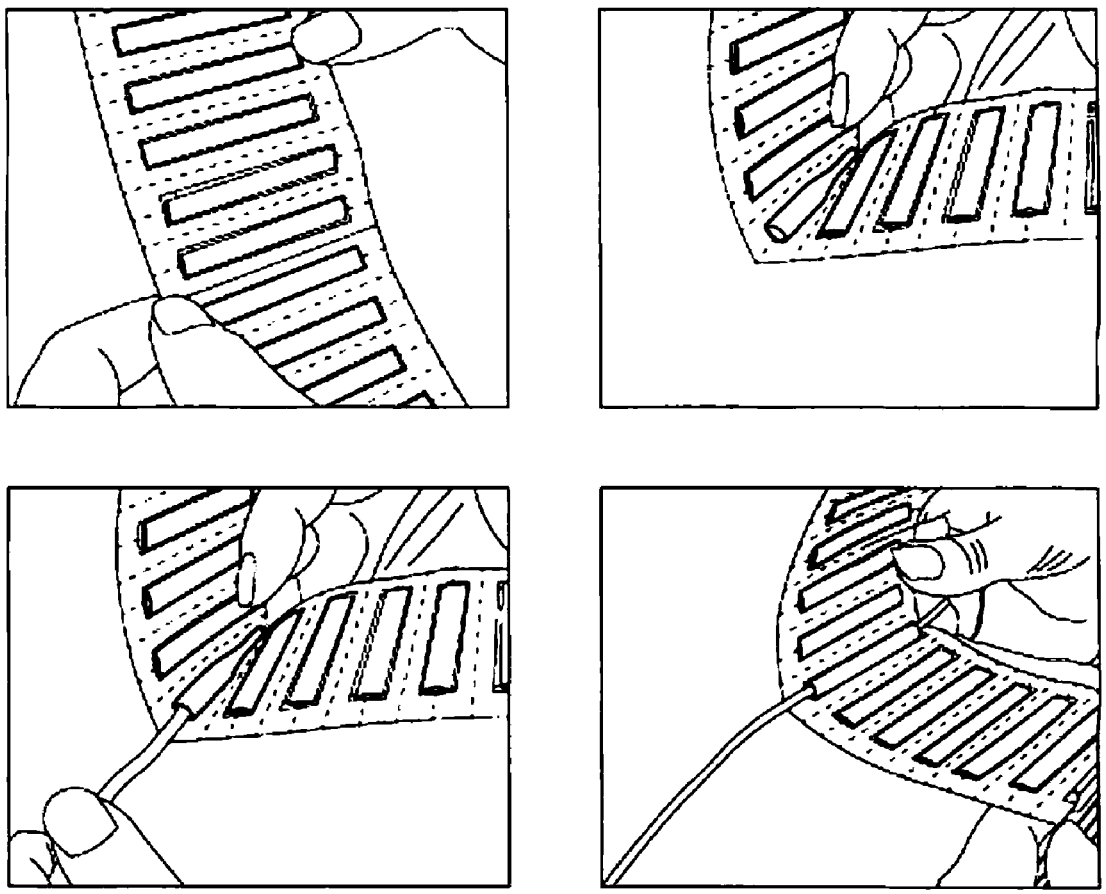
FIG. 7 shows the carrier strip being folded in a second direction.

The labels 22 may then be printed on a front side 26 and/or a back side 28 with identification information, such as for wires, cables, etc. The label 22 may then be removed from the carrier strip 10 to form a marker. Marker access perforations 30 facilitate the removal of the label 22 from the carrier strip 10 and allow for insertion of a cable through the label. The marker access perforations 30 may be located on the film 12. The marker access perforations 30 are preferably positioned horizontal and adjacent to the ends of the die cut openings 14, as shown in FIG. 1. Folding the carrier strip 10 along the marker access perforations 30 in one direction causes the label 22 to peel away from the adhesive 20 at one side, presenting an edge that may be gripped for marker removal, as shown in FIG. 6. Folding the carrier strip 10 along the marker access perforations 30 in a second direction causes the label 22 to open and allow the insertion of a cable through the label 22, as shown in FIGS. 6 and 7.

The carrier strip 10 may further include carrier perforations 32, which are preferably horizontal and located in areas between die cut openings 14. The carrier perforations 32 facilitate the separation of a print job from the roll without the need for scissors or another cutting instrument.

In operation, a printer (not shown) prints wire information onto a carrier strip 10. When the carrier strip 10 comes out of the printer, a user separates the carrier strip from the roll by pulling the strip apart at a carrier perforation 32. The user then folds the carrier strip 10 along a marker access perforation 30 to loosen the label 22 from the adhesive 20, presenting an edge that may be gripped for removal. The user may then easily peel the printed label 22, or marker, from the carrier strip 10. The wire marker may then be applied to a cable or wire, or a group of cables or wires. Alternatively, folding the carrier strip 10 along a marker access perforation 30 may open the label 22 and allow insertion of a cable through the label 22.

While certain features and embodiments of the present application have been described in detail herein, it is to be understood that the application encompasses all modifications and enhancements within the scope and spirit of the following claims.

The invention claimed is:

1. A carrier strip comprising:
   a first layer having at least one opening;
   two bands applied to opposite edges of the first layer, the bands including an adhesive on at least one surface;
   a label secured into the opening and attached to the adhesive; and
   at least one access perforation located on the first layer that is horizontal and adjacent to one side of the opening.

2. The carrier strip of claim 1 wherein the at least one opening comprises a plurality of openings.

3. The carrier strip of claim 2 further comprising a plurality of carrier perforations located between each opening.

4. The carrier strip of claim 1 wherein the opening has a rectangular shape.

5. The carrier strip of claim 1 wherein the first layer is transparent.

6. The carrier strip of claim 1 wherein the adhesive is a pressure sensitive adhesive.

7. The carrier strip of claim 1 wherein the label is an opaque heat shrink tubing piece.

8. The carrier strip of claim 1 wherein the label has a front side and a back side, and includes printing on both sides.

9. The carrier strip of claim 1 wherein the label includes a tubing perforation.

10. The carrier strip of claim 1 wherein the at least one access perforation allows removal of the label from the adhesive.

11. The carrier strip of claim 1 wherein the at least one access perforation allows insertion of a cable through the label.

12. A carrier strip comprising:
    a first layer having a plurality of openings;
    two bands applied to opposite edges of the first layer, the bands including an adhesive on at least one surface;
    a label secured into the opening and attached to the adhesive;
    a plurality of horizontal carrier perforations located between each opening; and
    a plurality of access perforations located on the first layer that are horizontal and adjacent to one side of each opening.

13. The carrier strip of claim 12 wherein the access perforations allow removal of the label from the adhesive.

14. The carrier strip of claim 12 wherein the access perforations allow insertion of a cable through the label.

15. The carrier strip of claim 12 wherein the first layer is transparent.

16. The carrier strip of claim 12 wherein the opening has a rectangular shape.

17. The carrier strip of claim 12 wherein the adhesive is a pressure sensitive adhesive.

18. The carrier strip of claim 12 wherein the label is an opaque heat shrink tubing piece.

19. The carrier strip of claim 12 wherein the label has a front side and a back side, and includes printing on both sides.

20. The carrier strip of claim 12 wherein the label includes a tubing perforation.

* * * * *